(12) United States Patent
Hartman et al.

(10) Patent No.: US 10,011,763 B2
(45) Date of Patent: *Jul. 3, 2018

(54) METHODS TO DELIVER FLUIDS ON A WELL SITE WITH VARIABLE SOLIDS CONCENTRATION FROM SOLID SLURRIES

(71) Applicant: Schlumberger Technology Corporation, Sugar Land, TX (US)

(72) Inventors: Ryan Hartman, Northport, AL (US); Mohan K. R. Panga, Novosibirsk (RU); Bruno Drochon, Houston, TX (US); John W. Still, Katy, TX (US); Carlos Abad, Aberdeen (GB); Marieliz Garcia-Lopez De Victoria, Sugar Land, TX (US); Kevin W. England, Houston, TX (US); Isaac Aviles, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/911,168

(22) Filed: Jun. 6, 2013

(65) Prior Publication Data

US 2014/0069645 A1 Mar. 13, 2014

Related U.S. Application Data

(63) Continuation-in-part of application No. 12/870,937, filed on Aug. 30, 2010, now Pat. No. 8,496,056, (Continued)

(51) Int. Cl.
*C09K 8/80* (2006.01)
*E21B 43/267* (2006.01)
(Continued)

(52) U.S. Cl.
CPC .................. *C09K 8/80* (2013.01); *C09K 8/04* (2013.01); *C09K 8/64* (2013.01); *C09K 8/665* (2013.01);
(Continued)

(58) Field of Classification Search
CPC ........ E21B 43/267; E21B 43/04; E21B 43/26; E21B 43/261
See application file for complete search history.

(56) References Cited

U.S. PATENT DOCUMENTS 2,193,775 A 3/1940 Stratford
2,277,543 A 3/1942 Downs
(Continued)

FOREIGN PATENT DOCUMENTS

CA 2593607 A1 7/2006
CA 2710988 A1 7/2009
(Continued)

OTHER PUBLICATIONS

Kirk-Othmer Encyclopedia of Chemical Technology, vol. 17, pp. 143-167 (1982) "Petroleum (Drilling Fluids)."
(Continued)

*Primary Examiner* — Zakiya W Bates
(74) *Attorney, Agent, or Firm* — Andrea E. Tran

(57) ABSTRACT

A storable composition for oilfield application including a slurry of a carrier fluid and a particulate blend made of proppant; the particulate blend comprising at least a first amount of particulates having a first average particle size between about 100 and 5000 μm and at least a second amount of particulates having a second average particle size between about three and twenty times smaller than the first average particle size; such that a packed volume fraction of the particulate blend exceeds 0.74 and the particulate blend
(Continued)

volume is sufficient to substantially avoid settling of the particulate in the carrier fluid.

29 Claims, 1 Drawing Sheet

Related U.S. Application Data which is a continuation-in-part of application No. 12/174,137, filed on Jul. 16, 2008, now Pat. No. 7,784,541, application No. 13/911,168, which is a continuation-in-part of application No. 12/941,192, filed on Nov. 8, 2010, now abandoned.

(60) Provisional application No. 60/951,780, filed on Jul. 25, 2007.

(51) Int. Cl.
*E21B 43/04* (2006.01)
*C09K 8/64* (2006.01)
*C09K 8/76* (2006.01)
*C09K 8/04* (2006.01)
*C09K 8/66* (2006.01)

(52) U.S. Cl.
CPC ............... *C09K 8/76* (2013.01); *E21B 43/04* (2013.01); *E21B 43/267* (2013.01); *C09K 2208/28* (2013.01)

(56) References Cited

U.S. PATENT DOCUMENTS

| | | |
|---|---|---|
| 2,513,944 A | 7/1950 | Kessler |
| RE24,570 E | 11/1958 | Mangold et al. |
| 2,905,245 A | 9/1959 | De Priester |
| 3,362,475 A | 1/1968 | Huitt |
| 3,434,540 A | 3/1969 | Stein |
| 3,675,717 A | 7/1972 | Goins et al. |
| 3,711,405 A | 1/1973 | Pye |
| 3,815,680 A | 6/1974 | McGuire et al. |
| 3,851,709 A | 12/1974 | Fitch et al. |
| 3,887,474 A | 6/1975 | Senfe et al. |
| 3,922,173 A | 11/1975 | Misak |
| 3,937,283 A | 2/1976 | Bauer et al. |
| 4,051,900 A | 10/1977 | Hankins |
| 4,107,057 A | 8/1978 | Dill et al. |
| 4,143,715 A | 3/1979 | Pavlich |
| 4,233,165 A | 11/1980 | Salathiel et al. |
| 4,387,769 A | 6/1983 | Erbstoesser et al. |
| 4,456,067 A | 6/1984 | Pinner, Jr. |
| 4,506,734 A | 3/1985 | Nolte |
| 4,509,598 A | 4/1985 | Earl et al. |
| 4,526,695 A | 7/1985 | Erbstoesser et al. |
| 4,537,918 A | 8/1985 | Parcevaux et al. |
| 4,579,668 A | 4/1986 | Messenger |
| 4,606,407 A | 8/1986 | Shu |
| 4,652,257 A | 3/1987 | Chang |
| 4,652,441 A | 3/1987 | Okada et al. |
| 4,665,988 A | 5/1987 | Murphey et al. |
| 4,670,166 A | 6/1987 | McDougall et al. |
| 4,718,490 A | 1/1988 | Uhri |
| 4,738,897 A | 4/1988 | McDougall et al. |
| 4,785,884 A | 11/1988 | Armbruster |
| 4,809,783 A | 3/1989 | Hollenbeck et al. |
| 4,846,277 A | 7/1989 | Khalil et al. |
| 4,848,467 A | 7/1989 | Cantu et al. |
| 4,867,241 A | 9/1989 | Strubhar |
| 4,883,124 A | 11/1989 | Jennings, Jr. |
| 4,917,185 A | 4/1990 | Jennings, Jr. et al. |
| 4,951,751 A | 8/1990 | Jennings, Jr. |
| 4,957,165 A | 9/1990 | Cantu et al. |
| 4,968,353 A | 11/1990 | Kawasaki et al. |
| 4,968,354 A | 11/1990 | Nishiura et al. |
| 4,977,961 A | 12/1990 | Avasthi |
| 4,986,353 A | 1/1991 | Clark et al. |
| 4,986,355 A | 1/1991 | Casad et al. |
| 5,009,267 A | 4/1991 | Williamson et al. |
| 5,036,920 A | 8/1991 | Cornette et al. |
| 5,041,516 A | 8/1991 | Frechet et al. |
| 5,046,562 A | 9/1991 | Crema et al. |
| 5,080,170 A | 1/1992 | Whitebay et al. |
| 5,095,987 A | 3/1992 | Weaver et al. |
| 5,110,486 A | 5/1992 | Manalastas et al. |
| 5,161,618 A | 11/1992 | Jones et al. |
| 5,188,837 A | 2/1993 | Domb |
| 5,213,160 A | 5/1993 | Nahm et al. |
| 5,227,422 A | 7/1993 | Mitsuji et al. |
| 5,238,065 A | 8/1993 | Mondshine et al. |
| 5,238,067 A | 8/1993 | Jennings et al. |
| 5,318,382 A | 6/1994 | Cahill |
| 5,325,921 A | 7/1994 | Johnson et al. |
| 5,330,005 A | 7/1994 | Card et al. |
| 5,332,037 A | 7/1994 | Schmidt et al. |
| 5,333,689 A | 8/1994 | Jones et al. |
| 5,381,864 A | 1/1995 | Nguyen et al. |
| 5,415,228 A | 5/1995 | Price et al. |
| 5,435,391 A | 7/1995 | Jones |
| 5,439,055 A | 8/1995 | Card et al. |
| 5,447,199 A | 9/1995 | Dawson et al. |
| 5,492,178 A | 2/1996 | Nguyen et al. |
| 5,501,274 A | 3/1996 | Nguyen et al. |
| 5,501,275 A | 3/1996 | Card et al. |
| 5,507,342 A | 4/1996 | Copeland et al. |
| 5,518,996 A | 5/1996 | Maroy et al. |
| 5,551,516 A | 9/1996 | Norman et al. |
| 5,604,186 A | 2/1997 | Hunt et al. |
| 5,629,271 A | 5/1997 | Dobson, Jr. et al. |
| 5,713,416 A | 2/1998 | Chatterji et al. |
| 5,741,758 A | 4/1998 | Pakulski |
| 5,783,527 A | 7/1998 | Dobson, Jr. et al. |
| 5,893,416 A | 4/1999 | Read |
| 5,905,468 A | 5/1999 | Ikawa et al. |
| 5,908,073 A | 6/1999 | Nguyen et al. |
| 5,922,652 A | 7/1999 | Kowalski et al. |
| 5,934,376 A | 8/1999 | Nguyen et al. |
| 5,964,291 A | 10/1999 | Bourne et al. |
| 5,979,557 A | 11/1999 | Card et al. |
| 6,059,034 A | 5/2000 | Rickards et al. |
| 6,069,118 A | 5/2000 | Hinkel et al. |
| 6,114,410 A | 9/2000 | Betzold |
| 6,138,760 A | 10/2000 | Lopez et al. |
| 6,153,562 A * | 11/2000 | Villar ............... C04B 20/0076 106/816 |
| 6,156,805 A | 12/2000 | Smith et al. |
| 6,169,058 B1 | 1/2001 | Le et al. |
| 6,171,386 B1 | 1/2001 | Sabins |
| 6,172,011 B1 | 1/2001 | Card et al. |
| 6,176,307 B1 | 1/2001 | Danos et al. |
| 6,192,985 B1 | 2/2001 | Hinkel et al. |
| 6,209,643 B1 | 4/2001 | Nguyen et al. |
| 6,209,646 B1 | 4/2001 | Reddy et al. |
| 6,234,251 B1 | 5/2001 | Chatterji et al. |
| 6,239,183 B1 | 5/2001 | Farmer et al. |
| 6,258,859 B1 | 7/2001 | Dahayanake et al. |
| 6,271,181 B1 | 8/2001 | Chatteni et al. |
| 6,279,656 B1 | 8/2001 | Sinclair et al. |
| 6,302,207 B1 | 10/2001 | Nguyen et al. |
| 6,306,800 B1 | 10/2001 | Samuel et al. |
| 6,326,335 B1 | 12/2001 | Kowalski et al. |
| 6,328,105 B1 | 12/2001 | Betzold |
| 6,330,916 B1 | 12/2001 | Rickards et al. |
| 6,364,020 B1 | 4/2002 | Crawshaw et al. |
| 6,379,865 B1 | 4/2002 | Mao et al. |
| 6,380,136 B1 | 4/2002 | Bates et al. |
| 6,412,561 B1 | 7/2002 | Brown et al. |
| 6,435,277 B1 | 8/2002 | Qu et al. |
| 6,439,309 B1 | 8/2002 | Matherly et al. |
| 6,446,722 B2 | 9/2002 | Nguyen et al. |
| 6,448,206 B1 | 9/2002 | Griffith et al. |
| 6,464,009 B2 | 10/2002 | Bland et al. |
| 6,482,517 B1 | 11/2002 | Anderson |
| 6,506,710 B1 | 1/2003 | Hoey et al. |

(56) References Cited

U.S. PATENT DOCUMENTS

| | | |
|---|---|---|
| 6,543,538 B2 | 4/2003 | Tolman et al. |
| 6,555,507 B2 | 4/2003 | Chatterji et al. |
| 6,559,245 B2 | 5/2003 | Mao et al. |
| 6,599,863 B1 | 7/2003 | Palmer et al. |
| 6,626,991 B1 | 9/2003 | Drochon et al. |
| 6,637,517 B2 | 10/2003 | Samuel et al. |
| 6,656,265 B1 | 12/2003 | Garnier et al. |
| 6,703,351 B2 | 3/2004 | Stowe, II et al. |
| 6,703,352 B2 | 3/2004 | Dahayanake et al. |
| 6,719,054 B2 | 4/2004 | Cheng et al. |
| 6,723,683 B2 | 4/2004 | Crossman et al. |
| 6,725,930 B2 | 4/2004 | Boney et al. |
| 6,742,590 B1 | 6/2004 | Nguyen |
| 6,776,235 B1 | 8/2004 | England |
| 6,818,594 B1 | 11/2004 | Freeman et al. |
| 6,823,940 B2 | 11/2004 | Reddy et al. |
| 6,828,280 B2 | 12/2004 | England et al. |
| 6,860,328 B2 | 3/2005 | Gonzalez et al. |
| 6,874,578 B1 | 4/2005 | Garnier et al. |
| 6,877,560 B2 | 4/2005 | Nguyen et al. |
| 6,935,426 B1 | 8/2005 | Rainbolt et al. |
| 6,938,693 B2 | 9/2005 | Boney et al. |
| 6,949,491 B2 | 9/2005 | Cooke, Jr. |
| 6,989,195 B2 | 1/2006 | Anderson |
| 7,004,255 B2 | 2/2006 | Boney |
| 7,007,754 B2 | 3/2006 | Fanguy, Jr. et al. |
| 7,013,995 B2 | 3/2006 | Crawshaw et al. |
| 7,028,775 B2 | 4/2006 | Fu et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,060,661 B2 | 6/2006 | Dobson et al. |
| 7,066,260 B2 | 6/2006 | Sullivan et al. |
| 7,084,095 B2 | 8/2006 | Lee et al. |
| 7,116,560 B2 | 10/2006 | Chou et al. |
| 7,135,231 B1 | 11/2006 | Sinclair et al. |
| 7,148,185 B2 | 12/2006 | Fu et al. |
| 7,166,560 B2 | 1/2007 | Still et al. |
| 7,178,596 B2 | 2/2007 | Blauch et al. |
| 7,196,040 B2 | 3/2007 | Heath et al. |
| 7,213,651 B2 | 5/2007 | Brannon et al. |
| 7,216,705 B2 | 5/2007 | Saini et al. |
| 7,219,731 B2 | 5/2007 | Sullivan |
| 7,237,610 B1 | 7/2007 | Saini et al. |
| 7,261,157 B2 | 8/2007 | Nguyen et al. |
| 7,265,079 B2 | 9/2007 | Willberg et al. |
| 7,267,170 B2 | 9/2007 | Mang et al. |
| 7,267,174 B2 | 9/2007 | Gonsveld et al. |
| 7,275,596 B2 | 10/2007 | Willberg et al. |
| 7,284,611 B2 | 10/2007 | Reddy et al. |
| 7,290,615 B2 | 11/2007 | Christanti et al. |
| 7,294,347 B2 | 11/2007 | Menjoge et al. |
| 7,299,875 B2 | 11/2007 | Nguyen et al. |
| 7,303,018 B2 | 12/2007 | Cawiezel et al. |
| 7,334,635 B2 | 2/2008 | Nguyen |
| 7,337,839 B2 | 3/2008 | Ayoub et al. |
| 7,345,012 B2 | 3/2008 | Chen et al. |
| 7,373,991 B2 | 5/2008 | Vaidya et al. |
| 7,398,826 B2 | 7/2008 | Hoefer et al. |
| 7,398,829 B2 | 7/2008 | Hutchins et al. |
| 7,405,183 B2 | 7/2008 | Hanes, Jr. |
| 7,419,937 B2 | 9/2008 | Rimmer et al. |
| 7,451,812 B2 | 11/2008 | Cooper et al. |
| 7,482,311 B2 | 1/2009 | Willberg et al. |
| 7,493,955 B2 | 2/2009 | Gupta et al. |
| 7,494,957 B2 | 2/2009 | Pena et al. |
| 7,510,009 B2 | 3/2009 | Cawiezel et al. |
| 7,528,096 B2 | 5/2009 | Brannon et al. |
| 7,543,640 B2 | 6/2009 | MacDougall |
| 7,550,413 B2 | 6/2009 | Huang et al. |
| 7,559,369 B2 | 7/2009 | Roddy et al. |
| 7,565,929 B2 | 7/2009 | Bustos et al. |
| 7,569,522 B2 | 8/2009 | Pena et al. |
| 7,571,767 B2 | 8/2009 | Parker et al. |
| 7,581,590 B2 | 9/2009 | Lesko et al. |
| 7,624,802 B2 | 12/2009 | McCrary et al. |
| 7,644,761 B1 | 1/2010 | Gu et al. |
| 7,655,603 B2 | 2/2010 | Crews |
| 7,678,745 B2 | 3/2010 | Parris et al. |
| 7,703,531 B2 | 4/2010 | Huang et al. |
| 7,740,068 B2 | 6/2010 | Ballard |
| 7,775,282 B2 | 8/2010 | Hutchins et al. |
| 7,779,915 B2 | 8/2010 | Hutchins et al. |
| 7,784,541 B2 | 8/2010 | Hartman et al. |
| 7,789,145 B2 | 9/2010 | Patel |
| 7,789,146 B2 | 9/2010 | Panga et al. |
| 7,806,182 B2 | 10/2010 | Waters et al. |
| 7,833,947 B1 | 11/2010 | Kubala |
| 7,857,048 B2 | 12/2010 | Daniel et al. |
| 7,923,415 B2 | 4/2011 | Panga et al. |
| 7,931,088 B2 | 4/2011 | Stegemoeller et al. |
| 7,954,548 B2 | 6/2011 | Curimbaba et al. |
| 7,971,644 B2 | 7/2011 | Ladva et al. |
| 7,973,991 B2 | 7/2011 | Watanabe |
| 8,008,234 B2 | 8/2011 | Panga et al. |
| 8,042,614 B2 | 10/2011 | Sullivan et al. |
| 8,066,058 B2 | 11/2011 | Daniel et al. |
| 8,119,574 B2 | 2/2012 | Panga et al. |
| 8,167,043 B2 | 5/2012 | Willberg et al. |
| 8,168,570 B2 | 5/2012 | Barron et al. |
| 8,186,438 B2 | 5/2012 | Ali et al. |
| 8,210,249 B2 | 7/2012 | Panga et al. |
| 8,227,026 B2 | 7/2012 | McDaniel et al. |
| 8,230,925 B2 | 7/2012 | Willberg et al. |
| 8,234,072 B2 | 7/2012 | Smith, Jr. et al. |
| 8,281,857 B2 | 10/2012 | Willberg et al. |
| 8,490,698 B2 | 7/2013 | Panga et al. |
| 8,490,699 B2 | 7/2013 | Panga et al. |
| 8,496,056 B2 | 7/2013 | Hartman et al. |
| 9,080,440 B2 | 7/2015 | Panga et al. |
| 9,145,513 B2 | 9/2015 | Pershikova et al. |
| 9,238,772 B2 | 1/2016 | Panga et al. |
| 2002/0023752 A1 | 2/2002 | Qu et al. |
| 2002/0185278 A1 | 12/2002 | Brown et al. |
| 2003/0002195 A1 | 1/2003 | Sassolini et al. |
| 2003/0006037 A1 | 1/2003 | Brothers et al. |
| 2003/0051662 A1 | 3/2003 | Lee et al. |
| 2003/0060374 A1 | 3/2003 | Cook, Jr. |
| 2003/0134751 A1 | 7/2003 | Lee et al. |
| 2004/0022861 A1 | 2/2004 | Williams, III et al. |
| 2004/0045893 A1 | 3/2004 | Watanabe et al. |
| 2004/0060702 A1 | 4/2004 | Kotlar et al. |
| 2004/0074646 A1 | 4/2004 | Kotlar et al. |
| 2004/0094300 A1 | 5/2004 | Sullivan et al. |
| 2004/0106525 A1 | 6/2004 | Willberg et al. |
| 2004/0152601 A1 | 8/2004 | Still et al. |
| 2004/0209780 A1 | 10/2004 | Harris et al. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2005/0006089 A1 | 1/2005 | Justus et al. |
| 2005/0027499 A1 | 2/2005 | Bourbiaux et al. |
| 2005/0037928 A1 | 2/2005 | Qu et al. |
| 2005/0065037 A1 | 3/2005 | Constien |
| 2005/0080176 A1 | 4/2005 | Robb |
| 2005/0103496 A1 | 5/2005 | Todd et al. |
| 2005/0130845 A1 | 6/2005 | Freeman et al. |
| 2005/0130848 A1 | 6/2005 | Todd et al. |
| 2005/0155762 A1 | 7/2005 | Chen et al. |
| 2005/0160945 A1 | 7/2005 | Barlet-Gouedard et al. |
| 2005/0161220 A1 | 7/2005 | Todd et al. |
| 2005/0172699 A1 | 8/2005 | Hu et al. |
| 2005/0233895 A1 | 10/2005 | Mertens et al. |
| 2005/0252651 A1 | 11/2005 | Bosma et al. |
| 2005/0252659 A1 | 11/2005 | Sullivan et al. |
| 2005/0257932 A1 | 11/2005 | Davidson et al. |
| 2006/0006539 A1 | 1/2006 | Matsui et al. |
| 2006/0032636 A1 | 2/2006 | Lord et al. |
| 2006/0041060 A1 | 2/2006 | George et al. |
| 2006/0048943 A1 | 3/2006 | Parker et al. |
| 2006/0048944 A1 | 3/2006 | van Batenburg et al. |
| 2006/0052251 A1 | 3/2006 | Anderson et al. |
| 2006/0054324 A1 | 3/2006 | Sullivan et al. |
| 2006/0058197 A1 | 3/2006 | Brown et al. |

(56) References Cited

U.S. PATENT DOCUMENTS

| | | |
|---|---|---|
| 2006/0065397 A1 | 3/2006 | Nguyen et al. |
| 2006/0073980 A1 | 4/2006 | Brannon et al. |
| 2006/0078682 A1 | 4/2006 | McDaniel et al. |
| 2006/0102344 A1 | 5/2006 | Surjaatmadja et al. |
| 2006/0113077 A1 | 6/2006 | Willberg et al. |
| 2006/0113078 A1 | 6/2006 | Nguyen et al. |
| 2006/0124302 A1 | 6/2006 | Gupta et al. |
| 2006/0144595 A1 | 7/2006 | Milligan et al. |
| 2006/0151173 A1 | 7/2006 | Slabaugh et al. |
| 2006/0157243 A1 | 7/2006 | Nguyen |
| 2006/0169450 A1 | 8/2006 | Mang et al. |
| 2006/0172894 A1 | 8/2006 | Mang et al. |
| 2006/0175059 A1 | 8/2006 | Sinclair et al. |
| 2006/0185848 A1 | 8/2006 | Surjaatmadja et al. |
| 2006/0205605 A1 | 9/2006 | Dessinges et al. |
| 2006/0289160 A1 | 12/2006 | van Batenburg et al. |
| 2007/0017675 A1 | 1/2007 | Hammami et al. |
| 2007/0029086 A1 | 2/2007 | East, Jr. |
| 2007/0039733 A1 | 2/2007 | Welton et al. |
| 2007/0042912 A1 | 2/2007 | Welton et al. |
| 2007/0125276 A1 | 6/2007 | Reddy et al. |
| 2007/0238622 A1 | 10/2007 | Fu et al. |
| 2007/0238623 A1 | 10/2007 | Saini et al. |
| 2007/0298977 A1 | 12/2007 | Mang et al. |
| 2008/0000391 A1 | 1/2008 | Drochon |
| 2008/0000638 A1 | 1/2008 | Burukhin et al. |
| 2008/0026062 A1 | 1/2008 | Farr et al. |
| 2008/0026955 A1 | 1/2008 | Munoz et al. |
| 2008/0027157 A1 | 1/2008 | Munoz et al. |
| 2008/0053657 A1 | 3/2008 | Alary et al. |
| 2008/0066910 A1 | 3/2008 | Alary et al. |
| 2008/0093073 A1 | 4/2008 | Bustos et al. |
| 2008/0103065 A1 | 5/2008 | Reddy et al. |
| 2008/0108520 A1 | 5/2008 | Fu |
| 2008/0121395 A1 | 5/2008 | Reddy et al. |
| 2008/0128131 A1 | 6/2008 | Nguyen et al. |
| 2008/0135250 A1 | 6/2008 | Bosma et al. |
| 2008/0139416 A1 | 6/2008 | Rimassa et al. |
| 2008/0142222 A1 | 6/2008 | Howard et al. |
| 2008/0166804 A1 | 7/2008 | Shamblott et al. |
| 2008/0182762 A1 | 7/2008 | Huang et al. |
| 2008/0196896 A1 | 8/2008 | Bustos et al. |
| 2008/0200352 A1 | 8/2008 | Willberg et al. |
| 2008/0202744 A1 | 8/2008 | Crews et al. |
| 2008/0210423 A1 | 9/2008 | Boney |
| 2008/0217012 A1 | 9/2008 | Delorey et al. |
| 2008/0280788 A1 | 11/2008 | Parris et al. |
| 2008/0280790 A1 | 11/2008 | Mirakyan et al. |
| 2008/0314594 A1 | 12/2008 | Still et al. |
| 2008/0318026 A1 | 12/2008 | Dai et al. |
| 2009/0008095 A1 | 1/2009 | Duncum et al. |
| 2009/0025394 A1 | 1/2009 | Bonzani et al. |
| 2009/0025932 A1 | 1/2009 | Panga et al. |
| 2009/0025933 A1 | 1/2009 | Garcia-Lopez de Victoria et al. |
| 2009/0025934 A1 | 1/2009 | Hartman et al. |
| 2009/0107671 A1 | 4/2009 | Waters et al. |
| 2009/0176665 A1 | 7/2009 | Mang et al. |
| 2009/0197780 A1 | 8/2009 | Weaver et al. |
| 2009/0205824 A1 | 8/2009 | Sullivan et al. |
| 2009/0253596 A1 | 10/2009 | Huang et al. |
| 2009/0294126 A1 | 12/2009 | Dalrymple et al. |
| 2009/0301725 A1 | 12/2009 | Case et al. |
| 2010/0000735 A1 | 1/2010 | Weaver et al. |
| 2010/0004146 A1 | 1/2010 | Panga et al. |
| 2010/0065271 A1 | 3/2010 | McCrary et al. |
| 2010/0087341 A1 | 4/2010 | Alary et al. |
| 2010/0087342 A1 | 4/2010 | Alary et al. |
| 2010/0089580 A1 | 4/2010 | Brannon et al. |
| 2010/0126722 A1 | 5/2010 | Cornelissen et al. |
| 2010/0155371 A1 | 6/2010 | Gentsch |
| 2010/0155372 A1 | 6/2010 | Battisti et al. |
| 2010/0163225 A1 | 7/2010 | Abad et al. |
| 2010/0196277 A1 | 8/2010 | DeSimone et al. |
| 2010/0200247 A1 | 8/2010 | Dybevik et al. |
| 2010/0243250 A1 | 9/2010 | Panga et al. |
| 2010/0252259 A1 | 10/2010 | Horton |
| 2010/0300688 A1 | 12/2010 | Panga et al. |
| 2010/0323932 A1 | 12/2010 | Bustos et al. |
| 2011/0005760 A1 | 1/2011 | Hartman et al. |
| 2011/0030958 A1 | 2/2011 | Fedorov et al. |
| 2011/0036577 A1 | 2/2011 | Barmatov et al. |
| 2011/0053813 A1 | 3/2011 | Panga et al. |
| 2011/0083849 A1 | 4/2011 | Medvedev et al. |
| 2011/0098202 A1 | 4/2011 | James et al. |
| 2011/0114313 A1 | 5/2011 | Lesko et al. |
| 2011/0120713 A1 | 5/2011 | Todd et al. |
| 2011/0155371 A1 | 6/2011 | Panga et al. |
| 2011/0198089 A1 | 8/2011 | Panga et al. |
| 2011/0204533 A1 | 8/2011 | Winchester et al. |
| 2011/0247812 A1 | 10/2011 | Panga et al. |
| 2011/0312857 A1 | 12/2011 | Amanullah et al. |
| 2012/0000641 A1 | 1/2012 | Panga et al. |
| 2012/0000651 A1 | 1/2012 | Panga et al. |
| 2012/0000653 A1 | 1/2012 | Panga et al. |
| 2012/0048549 A1 | 3/2012 | Willberg et al. |
| 2012/0067581 A1 | 3/2012 | Auzerais et al. |
| 2012/0111563 A1 | 5/2012 | Abad et al. |
| 2012/0125617 A1 | 5/2012 | Gu et al. |
| 2012/0132421 A1 | 5/2012 | Loiseau et al. |
| 2012/0138296 A1 | 6/2012 | Panga et al. |
| 2012/0190598 A1 | 7/2012 | McCubbins, Jr. et al. |
| 2012/0247764 A1 | 10/2012 | Panga et al. |
| 2012/0285694 A1 | 11/2012 | Morvan et al. |
| 2012/0305245 A1 | 12/2012 | Loiseau et al. |
| 2012/0305247 A1 | 12/2012 | Chen et al. |
| 2012/0305254 A1 | 12/2012 | Chen et al. |
| 2013/0233542 A1 | 9/2013 | Shampine et al. |
| 2013/0319667 A1 | 12/2013 | Chen |
| 2013/0324444 A1 | 12/2013 | Lesko et al. |
| 2014/0034320 A1 | 2/2014 | Ladva et al. |
| 2014/0131040 A9 | 5/2014 | Panga et al. |

FOREIGN PATENT DOCUMENTS

| | | |
|---|---|---|
| CN | 1863984 A | 11/2006 |
| CN | 103173003 A | 6/2013 |
| EP | 0368395 A1 | 5/1990 |
| EP | 1236701 | 9/2002 |
| EP | 1534926 | 11/2009 |
| EP | 2473705 | 7/2012 |
| GB | 1575507 | 9/1980 |
| GB | 2277543 | 2/1994 |
| GB | 2277927 A | 11/1994 |
| RU | 2065442 | 8/1996 |
| RU | 2221130 | 1/2004 |
| RU | 2376451 | 12/2009 |
| RU | 2404359 | 11/2010 |
| RU | 2413064 | 2/2011 |
| RU | 2417243 | 4/2011 |
| SU | 1559116 | 4/1990 |
| SU | 1745891 | 7/1992 |
| SU | 177382 | 2/1996 |
| WO | 9930249 | 6/1999 |
| WO | 0196707 A1 | 12/2001 |
| WO | 03087010 A1 | 10/2003 |
| WO | 03106809 A1 | 12/2003 |
| WO | 2004007904 A1 | 1/2004 |
| WO | 2004038176 | 5/2004 |
| WO | 2006055304 A2 | 5/2006 |
| WO | 2006082359 | 8/2006 |
| WO | 2006106287 A1 | 10/2006 |
| WO | 2007033489 A2 | 3/2007 |
| WO | 2007063317 A1 | 6/2007 |
| WO | 2007086771 A1 | 8/2007 |
| WO | 2007126318 A1 | 11/2007 |
| WO | 2008117222 A1 | 10/2008 |
| WO | 2009013710 | 1/2009 |
| WO | 2009045877 A1 | 4/2009 |
| WO | 2009046980 A1 | 4/2009 |
| WO | 2009088317 | 7/2009 |
| WO | 2009106796 A1 | 9/2009 |
| WO | 2009141749 A2 | 11/2009 |
| WO | 2010117457 A2 | 10/2010 |
| WO | 2010117547 | 10/2010 |

(56) References Cited

FOREIGN PATENT DOCUMENTS

| WO | 2011002285 A1 | 1/2011 |
|---|---|---|
| WO | 2011050046 A1 | 4/2011 |
| WO | 2011143055 | 11/2011 |
| WO | 2013085412 A1 | 6/2013 |

OTHER PUBLICATIONS

Kirk-Othmer Encyclopedia of Chemical Technology, vol. 7, pp. 297-299 (1965).
Curry et al., SPE 131783, "Less Sand May Not be Enough,"Feb. 2010, SPR Unconventional Gas Conference, Pittsburgh, PA, USA, pp. 23-25.
De Pater et al., "Experiments and numerical simulation of hydraulic fracturing in naturally fractured rock," ARMA/USRMS 05-780, Jun. 25-29, 2010, The 40th U.S. Symposium of Rock Mechanics (USRMS), Anchorage, AK, USA.
Nolte, K.G., "Application of Fracture Design Based on Pressure Analysis," SPE 13393, SPE Production Engineering, vol. 3, No. 1, Feb. 1988, pp. 31-42.
Nolte et al., "Interpretation Fracturing Pressures," SPE 8297, JPT, vol. 12, No. 8, Sep. 1981, pp. 1767-1775.
Smith et al., "Tip Screenout Fracturing: A Technique for Soft, Unstable Formations," SPE 13273, SPE Production Engineering, vol. 2, No. 2, May 1987, pp. 95-103.
Asgian et al., "Mechanical Stability of Propped Hydraulic Fractures: A Numerical Study," SPE 28510, JPT, Mar. 1995, pp. 203-208.
Milton-Tayler et al., "Factors Affecting the Stability of Proppant in Propped Fractures: Results of a Laboratory Study," SPE 24821, presented at the SPE Annual Technical Conference and Exhibition, Oct. 4-7, 1992, Washington, DC.
Thiercelin et al., "On the Modeling of Near Tip Processes in Hydraulic Fracturing," International journal of rock mechanics and mining sciences & geomechanics abstracts, 30(7), 1993, pp. 1127-1134.
Desroches, J. et al, "The Crack Tip Region in Hydraulic Fracturing," Proc. R. Soc. Lond. A, 1994 447, pp. 49-48.
Schlumberger CemCRETE Brochure (2003).
Schlumberger, Cementing Services and Products Materials, pp. 39-76 (2012).
Cipolla et al., Fracture Design Considerations in Horizontal Wells Drilled in Unconventional Gas Reservoirs, SPE 119366 (2009) 10 pages.
Economides M.J. and Nolte K.G., Reservoir Stimulation, John Wiley and Sons, Ltd, 3rd Edition New York, 2000—Chapter 10, "Fracture Treatment Design" by Jack Elbel and Larry Britt, (pp. 10-1 to 10-50).
Economides M.J. and Nolte K.G., Reservoir Stimulation, John Wiley and Sons, Ltd, 3rd Edition New York, 2000—Chapter 8, "Performance of Fracturing Materials" by V.G Constien et al., (pp. 8-1 to 8-26).
Economides M.J. and Nolte K.G., Reservoir Stimulation, John Wiley and Sons, Ltd, 3rd Edition New York, 2000—Chapter 5, "Basics of Hydraulic Fracturing"by M.B.Smith and J.W. Shlyapobersky, (pp. 5-1 to 5-28).
Economides M.J. and Nolte K.G., Reservoir Stimulation, John Wiley and Sons, Ltd, 3rd Edition New York, 2000—Chapter 7, "Fracturing Fluid Chemistry and Proppants" by Janet Gulbis and Richard M.Hogde, (pp. 7-1 to 7-23).
International Search Report and Written Opinion issued in Application No. PCT/US2011/059052 filed Nov. 3, 2011 dated Feb. 27, 2012 (14 pages).
Albertsson, et al., "Aliphatic Polyesters: Synthesis, Properties and Applications", Advances in Polymer Science: Degradable Aliphatic Polyesters, vol. 157, Springer-Verlag Berlin Heidelberg, 2002, pp. 1-40.
Notification of Readiness to Grant with Translation issued in Eurasian Patent Application No. EA201070181 on Feb. 18, 2013, 7 pages.
Official Action with Translation issued in Eurasian Patent Application No. EA201070181 dated Sep. 20, 2011, 9 pages.
Official Action with Translation issued in Eurasian Patent Application No. EA201070181 dated Feb. 6, 2012, 2 pages.
Official Action with Translation issued in Eurasian Patent Application No. EA201070181 dated Jun. 13, 2102, 2 pages.
Official Action with Translation issued in Eurasian Patent Application No. EA201300739 dated Aug. 4, 2015, 7 pages.
Official Action with Translation issued in Eurasian Patent Application No. EA201300739 dated Dec. 2, 2015, 4 pages.
Edlund, et al., "Degradable Polymer Microspheres for Controlled Drug Delivery", Advances in Polymer Science: Degradable Aliphatic Polyesters, vol. 157, Springer-Verlag Berlin Heidelberg, 2002, pp. 67-112.
Examination Report issued in Gulf Cooperation Council Patent Appl. No. GCC/P/2008/11368 dated Nov. 24, 2012, 3 pages.
Hakkarainen, et al., "Aliphatic Polyesters: Abiotic and Biotic Degradation and Degradation Products", Advances in olymer Science: Degradable Aliphatic Polyesters, vol. 157, Springer-Verlag Berlin Heidelberg, 2002, pp. 113-138.
International Preliminary Report on Patentability & Written Opinion issued in International Patent Appl. No. PCT/IB2008/052944 dated Jan. 26, 2010, 7 pages.
International Search Report issued in International Patent Appl. No. PCT/IB2008/052944 dated Feb. 2, 2009, 5 pages.
Stridsberg, et al., "Controlled Ring-Opening Polymerization: Polymers with Designed Macromolecular Architecture", Advances in Polymer Science: Degradable Aliphatic Polyesters, vol. 157, Springer-Verlag Berlin Heidelberg, 2002, pp. 41-65.
Examination Report issued in GCC Patent Application No. GCC/P/2008/11368 on Apr. 29, 2016; 3 pages.
Aveyard et al; "Emulsions stabilised solely by colloidal particles"; Advances in Colloid and Interface Science 100-102 pp. 503-546 (2003).
Binks et al; "Pickering emulsions stabilized by monodisperse latex particles: Effects of particle size"; Langmuir vol.17 iss:15 p. 4540-4547 (2001).
Montagne etal; "Highly magnetic latexes from submicrometer oil in water ferrofluid emulsions"; Journal of polymer science. Part A, Polymer chemistry vol. 44 iss:8 p. 2642-2656 (2006).
Park et al; "Rheological Properties and Stabilization of Magnetorheological Fluids in a Water-in-Oil Emulsion"; Journal of Colloid and Interface Science 240, 349-354 (2001).
Pickering, Su; "Emulsions" Journal of the Chemical Society vol. 91 pp. 2001-2021 (1907).
Desgouilles et al.; "The Design of Nanoparticles Obtained by Solvent Evaporation: A Comprehensive Study;" Langmuir, 2003 (19), pp. 9504-9510.
American Chemical Society, "Software estimates chemical, physical properties", Chemical & Engineering News, vol. 63, No. 5, Feb. 4, 1985, p. 27.
Economides, et al., "Fluid loss under static conditions", Reservoir Stimulation, 3rd Edition, John Wiley & Sons, New York, Chapter 8, 2000, pp. 8-23-8-24.
May, et al., "The Effect of Yield Stress on Fracture Fluid Cleanup", SPE 38619-SPE Annual Technical Conference and Exhibition, San Antonio, TX, Oct. 1997, pp. 517-530.
Newkome, et al., "Cascade molecules. Part 6. Synthesis and characterization of two-directional cascade molecules and formation of aqueous gels", Journal of the American Chemical Society, vol. 112, No. 23, 1990, pp. 8458-8465.
Tomalia, et al., "Starburst Dendrimers: Molecular-Level Control of Size, Shape, Surface Chemistry, Topology, and Flexibility from Atoms to Macroscopic Matter", Angewandte Chemie International Edition in English, vol. 29, No. 2, 1990, pp. 138-175.
Voneiff, et al., "The Effects of Unbroken Fracture Fluid on Gaswell Performance", SPE 26664—SPE Production & Facilities, vol. 1, No. 4, Nov. 1996, pp. 223-229.
Clariant GmbH, "The Mowiol Range: B4 IR Spectroscopy", in Mowiol-Polyvinyl Alcohol, GCS 1103e, Dec. 1999, pp. B8 to B9.

(56) References Cited

OTHER PUBLICATIONS

Lo et al., "Encapsulated Breaker Release Rate at Hydrostatic Pressure and Elevated Temperatures," paper SPE 77744 presented at the 2002 SPE Annual Technical Conference and Exhibition, San Antonio, TX, Sep. 29-Oct. 2, 2002, 15 pages.
Still et al., "An Improved Encapsulated Breaker to Decrease Hydrostatic Release and Improve Thermal Stability," paper SPE 80220 presented at the 2003 SPE International Symposium on Oilfield Chemistry, Houston, TX, Feb. 5-7, 2003, 9 pages.
Geertsma et al., "A Rapid Method of Predicting Width and Extent of Hydraulically Induced Fractures," JPT, Dec. 1969, pp. 1571—1581.
"Drying" retrieved Jul. 14, 2014 from http://en.wikipedia.org/wiki/Drying.
"Embed" retrieved Jul. 14, 2014 from http://dictionary.reference.com/browse/embed?s=t.
Low et al., Designing Fibered Cement Slurries for Lost Circulation Applications: Case Histories, SPE 84617, 2003, 8 pages.
Smith et al., "Chapter 10: Set Mechanisms and Oxygen Nucleophiles", Mar.'s Advanced Organic Chemistry Reactions, Mechanisms, and Struture Sixth Edition, John Wiley & Sons: New Jersey, 2007, pp. 470-471 and 532-533.
Nelson et al., "Cement Additives and Mechanisms of Action", AntiSettling agents, Section 3-7, Chapter 3, Well cementing, Second Edition, 2006, pp. 49-91.

\* cited by examiner

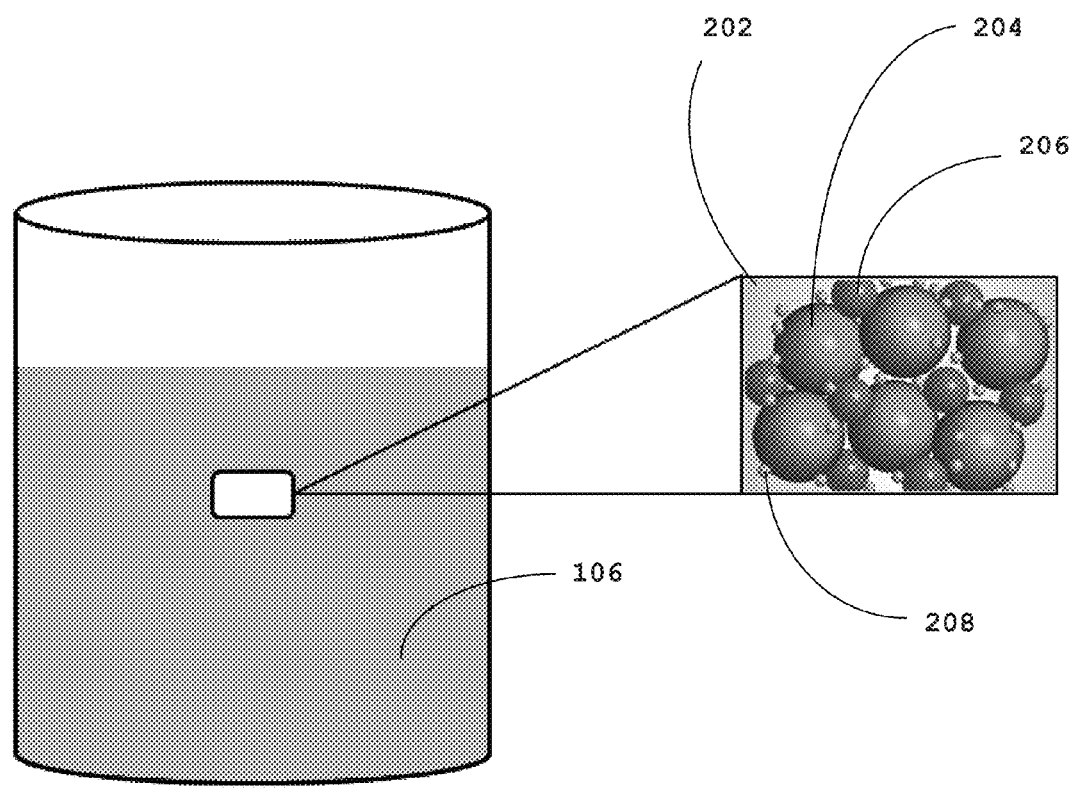

METHODS TO DELIVER FLUIDS ON A WELL SITE WITH VARIABLE SOLIDS CONCENTRATION FROM SOLID SLURRIES

CROSS REFERENCE APPLICATIONS

This application is a continuation-in-part of U.S. application Ser. No. 12/870,937, filed on Aug. 30, 2010 now published as US 2011/0005760, entitled "SYSTEM AND METHOD FOR LOW DAMAGE FRACTURING" filed on Aug. 30, 2010, which is a continuation-in-part application of U.S. application Ser. No. 12/174,137, now U.S. Pat. No. 7,784,541, entitled "SYSTEM AND METHOD FOR LOW DAMAGE FRACTURING" filed on Jul. 16, 2008 and claiming priority to U.S. Provisional Application No. 60/951,780, entitled "FORMATION PERMEABILITY CONTROL FLUIDS HAVING OPTIMIZED PACKING VOLUME FRACTION" filed on Jul. 25, 2007; this application is also a continuation-in-part of U.S. application Ser. No. 12/941,192, entitled "METHODS TO DELIVER FLUIDS ON A WELL SITE WITH VARIABLE SOLIDS CONCENTRATION FROM SOLID SLURRIES" filed on Nov. 8, 2010; the entire contents of each are hereby incorporated by reference.

FIELD OF APPLICATION

The application relates to methods for treating well bores. More particularly, the application relates to methods for delivery of fluids with variable solids concentration within.

BACKGROUND

The statements in this section merely provide background information related to the present disclosure and may not constitute prior art.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (usually acid) stimulation, or a combination of the two (called acid fracturing or fracture acidizing).

In hydraulic and acid fracturing, a first, viscous fluid called the pad is typically injected into the formation to initiate and propagate the fracture. This is followed by a second fluid that contains a proppant to keep the fracture open after the pumping pressure is released. Granular proppant materials may include sand, ceramic beads, or other materials. These types of materials are well known to those skilled in the art. In "acid" fracturing, the second fluid contains an acid or other chemical such as a chelating agent that can dissolve part of the rock, causing irregular etching of the fracture face and removal of some of the mineral matter, resulting in the fracture not completely closing when the pumping is stopped. Occasionally, hydraulic fracturing can be done without a highly viscosified fluid (i.e., slick water) to minimize the damage caused by polymers or the cost of other viscosifiers.

In gravel packing, gravel is placed in the annulus of screen and formation/casing to control formation sand production. A carrier fluid is used to transport gravel from the surface to the formation where the gravel has to be placed. Typically two types of carrier fluids are used. The first is a brine with a low concentration of gravel (1 lb per gal of brine) and the second is a viscous fluid with higher concentration of gravel (5 lb per gal of brine). Several types of viscosifiers are used to increase the viscosity of the fluid. These include polymers such as HEC, Xanthan, Guar and guar derivatives, etc. and viscoelastic surfactants. In a combination of gravel packing and hydraulic fracturing, referred to in the industry as frac and pack, a viscous fluid is typically pumped to create/propagate a hydraulic fracture by pumping a pad fluid followed by a slurry (fluid containing proppant) to completely fill the hydraulic fracture. In this type of treatment it is critical to completely fill the fracture to the point where no additional propagation occurs and the remaining slurry is "squeezed" into the hydraulic fracture with increasing pressure. This is referred to in the industry as a tip screenout (TSO). This is important because the next step of the frac and pack is to shift the flow of the fluid being pumped to now perform the gravel pack part of the operation. This technique is known by those skilled in the art.

Conventionally, the components are mixed at the surface prior to being pumped into the well with a pumping device. Further peripheral devices are present such as a blender, a particulates hauler, fluid storage tank(s), and other devices understood in the art. Water from the storage tank is mixed with a viscosifying agent or various additives to create the base fracturing fluid. Proppant or particulates are added to the fracturing fluid from a conveyor at the blender, or are added directly by the blender (this method is on-the-fly). In some gravel pack operations, and may be done rarely in frac and pack treatments, the base fluid and particulates (proppant) are batch-mixed before being pumped in the wellbore.

The mixing of the components has to be done on site and prior to pumping into the well, because the transport and storage of already prepared solid fluids (with proppant, gravel, or other particulate material) suffer from a lot of drawbacks. A common problem that occurs during premixed slurry transport or storage is the setting of solids due to difference in densities of the fluid and the solid particles. If the solids start settling before the fluid is used, the fluid will need to be remixed prior to use. If use of such settled fluid was tried, several problems can occur including screen outs, incomplete gravel packs, wellbore blockage, stuck tools etc. To reduce the settling rate, the carrier fluid is typically viscosified using polymers or surfactants. However, increasing the viscosity of the fluid can increase the friction pressure significantly and renders the fluid not pumpable. An alternative would be to add fiber to the fluid mixture (FiberFRAC—Mark of Schlumberger). In this case the fluid viscosity essentially stays the same but the proppant suspension is significantly better. Other methods could be to use lighter density proppant so that the density between fluid and proppant is minimized so that proppant suspension is improved. The best case would be where the fluid and the proppant are equal density.

Compositions and methods disclosed herewith offer a new way to deliver fluid with variable solid concentrations on well site.

SUMMARY

In a first aspect, a storable composition for oilfield application is disclosed. The composition includes a slurry of a carrier fluid and a particulate blend made of proppant; the particulate blend comprising at least a first amount of particulates having a first average particle size between about 100 and 5000 μm and at least a second amount of particulates having a second average particle size between about three and twenty times smaller than the first average particle size; such that a packed volume fraction of the particulate blend exceeds 0.74 and the particulate blend volume is sufficient to substantially avoid settling of the particulate in the carrier fluid. The packed volume fraction or packing volume fraction (PVF) is the fraction of the solid content volume to the total volume content. In another embodiment, the first amount of particulates has a first average particle size between about 100 and 2000 μm.

In a second aspect, a method of servicing a well on a well site is disclosed. The method includes the steps of defining a type of treatment needed for the well; estimating for the type of treatment a concentration and volume of proppant needed; and providing on the well site the needed concentration of proppant from a ready-to-use composition made of a slurry of a carrier fluid and a particulate blend made of proppant.

BRIEF DESCRIPTION OF THE DRAWINGS

FIG. 1 shows an illustration of the storable composition according to one embodiment.

DETAILED DESCRIPTION

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments of the application and should not be construed as a limitation to the scope and applicability of the application. In the summary of the application and this detailed description, each numerical value should be read once as modified by the term "about" (unless already expressly so modified), and then read again as not so modified unless otherwise indicated in context. Also, in the summary of the application and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a well bore, by pumping fluid at very high pressures (pressure above the determined closure pressure of the formation), in order to increase production rates from a hydrocarbon reservoir. The fracturing methods otherwise use conventional techniques known in the art.

FIG. 1 is a schematic diagram of a storable composition 106 used in methods to deliver fluids on a well site with variable solids concentration from solid slurries. The storable composition 106 includes a slurry of a carrier fluid 202 and a particulate blend made of proppant; the particulate blend comprising at least a first amount of particulates 204 having a first average particle size between about 100 and 5000 μm and at least a second amount of particulates 206 having a second average particle size between about three and twenty times smaller than the first average particle size.

According to one embodiment, the storable composition is used as a fracturing fluid and the carrier fluid has optionally a viscosifying agent. The carrier fluid includes any base fracturing fluid understood in the art. Some non-limiting examples of carrier fluids include hydratable gels (e.g. guars, poly-saccharides, xanthan, hydroxy-ethyl-cellulose, etc.), a cross-linked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. Additionally, the carrier fluid may be a brine, and/or may include a brine.

The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxy-propyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers effective as viscosifying agent include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without cross-linkers. Xanthan, diutan, and scleroglucan, three biopolymers, have been shown to have excellent particulate-suspension ability even though they are more expensive than guar derivatives and therefore have been used less frequently, unless they can be used at lower concentrations.

In other embodiments, the viscosifying agent is made from a crosslinkable, hydratable polymer and a delayed crosslinking agent, wherein the crosslinking agent comprises a complex comprising a metal and a first ligand selected from the group consisting of amino acids, phosphono acids, and salts or derivatives thereof. Also the crosslinked polymer can be made from a polymer comprising pendant ionic moieties, a surfactant comprising oppositely charged moieties, a clay stabilizer, a borate source, and a metal crosslinker. Said embodiments are described in U.S. Patent Publications US2008-0280790 and US2008-0280788 respectively, each of which are incorporated herein by reference.

The viscosifying agent may be a viscoelastic surfactant (VES). The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

In general, particularly suitable zwitterionic surfactants have the formula:

$$RCONH\text{---}(CH_2)_a(CH_2CH_2CH_2O)_m(CH_2)_b\text{---}$$
$$N^+(CH_3)_2\text{---}(CH_2)_{a'}(CH_2CH_2O)_{m'}(CH_2)_{b'}COO^-$$

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$. In some embodiments, a zwitterionic surfactants of the family of betaine is used.

Exemplary cationic viscoelastic surfactants include the amine salts and quaternary amine salts disclosed in U.S. Pat. Nos. 5,979,557, and 6,435,277 which are hereby incorporated by reference. Examples of suitable cationic viscoelastic surfactants include cationic surfactants having the structure:

$$R_1N^+(R_2)(R_3)(R_4)\ X^-$$

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1CON(R_2)CH_2X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The viscosifying agent may be present in lower amount than conventionally is included for a fracture treatment. The loading of a viscosifier, for example described in pounds of gel per 1,000 gallons of carrier fluid, is selected according to the particulate size (due to settling rate effects) and loading that the storable composition 106 must carry, according to the viscosity required to generate a desired fracture geometry, according to the pumping rate and casing or tubing configuration of the wellbore, according to the temperature of the formation of interest, and according to other factors understood in the art.

In certain embodiments, the low amount of a viscosifying agent includes a hydratable gelling agent in the carrier fluid at less than 20 pounds per 1,000 gallons of carrier fluid where the amount of particulates in the storable composition 106 are greater than 16 pounds per gallon of carrier fluid. In certain further embodiments, the low amount of a viscosifier includes a hydratable gelling agent in the carrier fluid at less than 20 pounds per 1,000 gallons of carrier fluid where the amount of particulates in the fracturing slurry 106 are greater than 23 pounds per gallon of carrier fluid. In certain embodiments, a low amount of a viscosifier includes a viscoelastic surfactant at a concentration below 1% by volume of carrier fluid. In certain embodiments, the low amount of a viscosifier includes the carrier fluid with no viscosifier included. In certain embodiments a low amount of a viscosifier includes values greater than the listed examples, because the circumstances of the storable composition conventionally utilize viscosifier amounts much greater than the examples. For example, in a high temperature application with a high proppant loading, the carrier fluid may conventionally indicate a viscosifier at 50 lbs. of gelling agent per 1,000 gallons of carrier fluid, wherein 40 lbs. of gelling agent, for example, may be a low amount of viscosifier. One of skill in the art can perform routine tests of storable composition based on certain particulate blends in light of the disclosures herein to determine acceptable viscosifier amounts for a particular embodiment.

In certain embodiments, the carrier fluid includes an acid. The fracture may be a traditional hydraulic bi-wing fracture, but in certain embodiments may be an etched fracture and/or wormholes such as developed by an acid treatment. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate. The selection of any acid as a carrier fluid depends upon the purpose of the acid—for example formation etching, damage cleanup, removal of acid-reactive particles, etc., and further upon compatibility with the formation, compatibility with fluids in the formation, and compatibility with other components of the fracturing slurry and with spacer fluids or other fluids that may be present in the wellbore. The selection of an acid for the carrier fluid is understood in the art based upon the characteristics of particular embodiments and the disclosures herein.

The storable composition includes a particulate blend made of proppant. Proppant selection involves many compromises imposed by economical and practical considerations. Criteria for selecting the proppant type, size, size distribution in multimodal proppant selection, and concentration is based on the needed dimensionless conductivity, and can be selected by a skilled artisan. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated (curable), or pre-cured resin coated. Proppants and gravels in the same or different wells or treatments can be the same material and/or the same size as one another and the term proppant is intended to include gravel in this disclosure. In some embodiments, irregular shaped particles may be used. International application WO 2009/088317 discloses a method of fracturing with a slurry of proppant containing from 1 to 100 percent of stiff, low elasticity, low deformability elongated particles. US patent application 2007/768393 discloses proppant that is in the form of generally rigid, elastic plate-like particles having a maximum to minimum dimension ratio of more than about 5, the proppant being at least one of formed from a corrosion resistant material or having a corrosion resistant material formed thereon. In general the proppant used will have an average particle size of from about 0.15 mm to about 4.76 mm (about 100 to about 4 U. S. mesh), sometimes from about 0.15 mm to about 3.36 mm (about 100 to about 6 U. S. mesh), sometimes from about 0.15 mm to about 4.76 mm (about 100 to about 4 U. S. mesh), more particularly, but not limited to 0.25 to 0.42 mm (40/60 mesh), 0.42 to 0.84 mm (20/40 mesh), 0.84 to 1.19 mm (16/20 mesh), 0.84 to 1.68 mm (12/20 mesh) and 0.84 to 2.38 mm (8/20 mesh) sized materials. Normally the proppant will be present in the slurry in a concentration from about 0.12 to about 0.96 kg/L, or from about 0.12 to about 0.72 kg/L, or from about 0.12 to about 0.54 kg/L. Also, there are slurries where the proppant is at a concentration up to 16 PPA (1.92 kg/L). If the slurry is foamed the proppant is at a concentration up to 20 PPA (2.4 kg/L). The storable composition is not a cement slurry composition.

The storable composition is a slurry comprising particulate materials with defined particles size distribution. On example of realization is disclosed in U.S. Pat. No. 7,784,541, herewith incorporated by reference in its entirety. In certain embodiments, the selection of the size for the first amount of particulates is dependent upon the characteristics of the propped fracture, for example the closure stress of the fracture, the desired conductivity, the size of fines or sand that may migrate from the formation, and other considerations understood in the art. In certain further embodiments, the selection of the size for the first amount of particulates 204 is dependent upon the desired fluid loss characteristics of the first amount of particulates as a fluid loss agent, the size of pores in the formation, and/or the commercially available sizes of particulates of the type comprising the first amount of particulates.

In certain embodiments, the selection of the size of the second amount of particulates 206 is dependent upon maximizing a packed volume fraction (PVF) of the mixture of the first amount of particulates and the second amount of particulates. The packed volume fraction or packing volume fraction (PVF) is the fraction of solid content volume to the total volume content. A second average particle size of between about seven to ten times smaller than the first amount of particulates contributes to maximizing the PVF of the mixture, but a size between about three to twenty times smaller, and in certain embodiments between about three to fifteen times smaller, and in certain embodiments between about three to ten times smaller will provide a sufficient PVF for most storable compositions. Further, the selection of the size of the second amount of particulates is dependent upon the composition and commercial availability of particulates of the type comprising the second amount of particulates. For example, where the second amount of particulates comprise wax beads, a second average particle size of four times (4×) smaller than the first average particle size rather than seven times (7×) smaller than the first average particle size may be used if the 4× embodiment is cheaper or more readily available and the PVF of the mixture is still sufficient to acceptably suspend the particulates in the carrier fluid. In certain embodiments, the particulates combine to have a PVF above 0.74 or 0.75 or above 0.80. In certain further embodiments the particulates may have a much higher PVF approaching 0.95.

In certain embodiments, the storable composition 106 further includes a third amount of particulates 208 having a third average particle size that is smaller than the second average particle size. In certain further embodiments, the storable composition 106 may have a fourth or a fifth amount of particles. Also in some embodiments, the same chemistry can be used for the third, fourth, or fifth average particle size. Also in some embodiments, different chemistry can be used for the same third average particle size: e.g. in the third average particle size, half of the amount is PLA and the other half is PGA. For the purposes of enhancing the PVF of the storable composition 106, more than three or four particles sizes will not typically be required. For example, a four-particle blend including 217 g of 20/40 mesh sand, 16 g or poly-lactic acid particles with an average size of 150 microns, 24 g of poly-lactic acid particles with an average size of 8 microns, and 53 g of $CaCO_3$ particles with an average size of 5 microns creates a particulate blend 111 having a PVF of about 0.863. In a second example, a three-particle blend wherein each particle size is 7× to 10× smaller than the next larger particle size creates a particulate blend having a PVF of about 0.95. However, additional particles may be added for other reasons, such as the chemical composition of the additional particles, the ease of manufacturing certain materials into the same particles versus into separate particles, the commercial availability of particles having certain properties, and other reasons understood in the art.

Also, the particulate blend volume is sufficient to substantially avoid settling of the particulate in the carrier fluid. In certain embodiments, the storable composition includes a degradable material or a viscosifier material embodied as a third, fourth or a fifth average particle size. For example, the particulates may be completely made from degradable material or viscosifier material, inactive in a first state and able to increase the viscosity of the carrier fluid in a second state. The activation from the first state to the second state is made by a trigger. In certain embodiments, the trigger is time, pH or temperature. One example of realization is disclosed in U.S. patent application Ser. No. 12/551,081 herewith incorporated by reference in its entirety. The viscosifier may be used to reduce or even avoid the settling rate. The settling rate can be avoided with specially chosen volume particulate blend, or by selecting appropriate chemistry with increase in the viscosity of the carrier fluid along storage of the composition 106.

In certain embodiments, the degradable material includes at least one of a lactide, a glycolide, an aliphatic polyester, a poly (lactide), a poly (glycolide), a poly (ε-caprolactone), a poly (orthoester), a poly (hydroxybutyrate), an aliphatic polycarbonate, a poly (phosphazene), and a poly (anhydride). In certain embodiments, the degradable material includes at least one of a poly (saccharide), dextran, cellulose, chitin, chitosan, a protein, a poly (amino acid), a poly (ethylene oxide), and a copolymer including poly (lactic acid) and poly (glycolic acid). In certain embodiments, the degradable material includes a copolymer including a first moiety which includes at least one functional group from a hydroxyl group, a carboxylic acid group, and a hydrocarboxylic acid group, the copolymer further including a second moiety comprising at least one of glycolic acid and lactic acid.

In certain embodiments, the viscosifier material includes an acid soluble polymer which is added to the storable composition along with an acid precursor. The acid precursor can be one of the degradable particles in the slurry. The acid soluble polymer is in the form of a solid particle at surface conditions. As the acid soluble polymers are solid particles having an average particle size, they can be included in the optimization process of PVF. Along storage of the slurry, the acid precursor releases acid and changes the pH of the carrier fluid. The acid soluble polymer particles dissolve in the fluid increasing the viscosity of the fluid. Examples of acid soluble polymers include chitosan or chitosan derivatives such as the N-carboxybutyl chitosan or the N-carboxymethyl chitosan, polyimides such as the examples described in U.S. Pat. No. 6,379,865 or 6,559,245, incorporated herewith by reference, copolymers of vinyl pyridine as those described in U.S. Pat. No. 7,294,347, incorporated herewith by reference, or copolymers of acrylic and/or methacrylic acid or mixture of those polymers.

In certain embodiments, the viscosifier material includes an acid soluble polymer which is added to the storable composition along with an encapsulated acid or acid precursors. The acid soluble polymer is of the type as disclosed in paragraph above. The acid required for triggering the dissolution of the acid soluble polymer is added to the mixture as the encapsulated acid or acid precursors. The encapsulated acid or acid precursors release acid after some time in the slurry. Examples include encapsulated PLA, PGA other hydroxy acids, citric, glycolic, maleic acid/anhydride etc. Encapsulated material can be a solid polymer acid precursor. Examples of solid polymer acid precursors that may be used include homopolymers of lactic acid, glycolic acid, hydroxybutyrate, hydroxyvalerate and epsilon caprolactone, random copolymers of at least two of lactic acid, glycolic acid, hydroxybutyrate, hydroxyvalerate, epsilon caprolactone, L-serine, L-threonine, L-tyrosine, block copolymers of at least two of polyglycolic acid, polylactic acid, hydroxybutyrate, hydroxyvalerate, epsilon caprolactone, L-serine, L-threonine, L-tyrosine, homopolymers of ethylenetherephthalate (PET), butylenetherephthalate (PBT) and ethylenenaphthalate (PEN), random copolymers of at least two of ethylenetherephthalate, butylenetherephthalate and ethylenenaphthalate, block copolymers of at least two of ethylenetherephthalate, butylenetherephthalate, ethylenenaphthalate and combinations of these. Some of the encapsulated material may include acrylics, halocarbon, polyvinyl alcohol, Aquacoat® aqueous dispersions, hydrocarbon resins, polyvinyl chloride, Aquateric® enteric coatings, hydroxypropyl cellulose (HPC), polyvinylacetate phthalate, hydroxypropyl methyl cellulose (HPMC), polyvinylidene chloride, hydroxylpropyl methyl cellulose phthalate (HPMCP), proteins, Kynar®, fluoroplastics, rubber (natural or synthetic), caseinates, maltodextrins, shellac, chlorinated rubber, silicone, polyvinyl acetate phtalate (e.g. Coateric®) coatings, microcrystalline wax, starches, coating butters, milk solids, stearines, polyvinyl dichloride (Daran®) latex, molasses, sucrose, dextrins, nylon, surfactants, Opadry® coating systems, Surelease® coating systems, enterics, paraffin wax, Teflon® fluorocarbons, Eudragits® polymethacrylates, phenolics, waxes, ethoxylated vinyl alcohol, vinyl alcohol copolymer, polylactides, zein, fats, polyamino acids, fatty acids, polyethylene gelatin, polyethylene glycol, glycerides, polyvinyl acetate, vegetable gums and polyvinyl pyrrolidone.

In some embodiments, the carrier fluid may optionally further comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the storable composition using a gas, such as air, nitrogen, or carbon dioxide.

In an exemplary embodiment, a method of servicing a well on a well site includes defining a type of treatment needed for the well; estimating for the type of treatment a concentration and a volume of proppant needed; and providing on the well site the needed concentration of proppant from the storable composition which is ready to use. By this way a delivery of variable concentration of proppant where the source of proppant is a pumpable slurry is achieved.

The method can further include estimating for the type of treatment an updated concentration and an updated volume of proppant needed; and providing on the well site the needed updated concentration of proppant. As well, it is possible that the step of estimating for the type of treatment the updated concentration and the updated volume of proppant needed be repeated during the treatment.

By bringing multiple storable ready-to-use compositions on the well site, it is possible to achieve different proppant concentrations. For example, it may be necessary to start with one proppant concentration and step up another proppant concentration as the treatment progresses.

In another exemplary embodiment a method of fracturing a well on a well site, includes estimating for the fracturing treatment a concentration and a volume of proppant needed; providing on the well site the needed concentration of proppant from a ready-to-use composition made of a slurry of a carrier fluid and a particulate blend made of proppant; and fracturing the well. Also, it is possible to bring multiple storable ready-to-use compositions on the well site. For example, it may be necessary to start with lower proppant concentration and step up to higher proppant concentration as the treatment progresses. This would be similar logic to conventional fracturing treatments. This way we would also have the opportunity to vary the concentrations of the second, third, and additional additives to potentially achieve a more optimum benefit.

A possible application would be to change the mode of fracturing in shales, by delivering the same or higher proppant concentration than current slick water treatments, by pumping alternative slugs of a flowable high solids slurry and of a clean friction reducing fluid without increasing the total friction in the pipe. The near wellbore effects such as perforation friction and tortuosity will be the same or reduced by the properties of this new pumpable slurry. This would allow the field to have flexibility in the use of other non-conventional equipment. A treatment pumped this way would be able to maintain the same or greater hydrostatic pressure than what is being pumped nowadays in a typical slick water, and without the risk of increasing the friction pressure that could result if a high solids content (and thus viscous) fluid would be pumped at high rate, or without the need of reducing the pump rate as would be required to ensure pumpable pressures (pressures lower that the maximum allowable surface pressure as dictated by the wellbore construction, wellhead, surface pumping equipment, or other weaker point) at surface with such a high solids content fluid.

The storable composition may be used for carrying out a variety of subterranean treatments, including, but not limited to, drilling operations, fracturing treatments, and completion operations (e.g., gravel packing). In some embodiments, the storable composition may be used in treating a portion of a subterranean formation. In certain embodiments, a storable composition may be introduced into a well bore that penetrates the subterranean formation as a treatment fluid. For example, the treatment fluid may be allowed to contact the subterranean formation for a period of time. In some embodiments, the treatment fluid may be allowed to contact hydrocarbons, formations fluids, and/or subsequently injected treatment fluids. After a chosen time, the treatment fluid may be recovered through the well bore. In certain embodiments, the treatment fluids may be used in fracturing treatments.

The method is also suitable for gravel packing, or for fracturing and gravel packing in one operation (called, for example frac and pack, frac-n-pack, frac-pack, STIMPAC (Mark of Schlumberger) treatments, or other names), which are also used extensively to stimulate the production of hydrocarbons, water and other fluids from subterranean formations. These operations involve pumping a slurry of fluid and propping agent/material in hydraulic fracturing or gravel (materials are generally the same as the proppants used in hydraulic fracturing) in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done during drilling and/or completion operations, to ensure good fluid communication between the reservoir and the wellbore and also to increase the surface area available for fluids to flow into the wellbore.

In certain embodiments, the storable composition may be used for providing some degree of sand control in a portion of the subterranean formation. In the sand control embodiments, the treatment fluid is introduced into the well bore that penetrates the subterranean formation such that the particulates form a gravel pack in or adjacent to a portion of the subterranean formation.

In a example, a conventional slick water treatment pumped today (typically this could be 100,000 gallons of fluid using 1 gpt (gallons per 1,000 gallons) of polyacrylamide and pumping an average additional 30,000 gallon of pad, and an average of 1 ppa (pounds of proppant added to one gallon of fluid) proppant during the prop stage) is replaced by a storable composition. The treatment is characterized by a treatment fluid averaging at least 1 ppa, formulated with alternating slugs of clean fluid and flowable proppant slurry, so that the length of each of the proppant slugs is at the most 1/50 of the total wellbore volume. The proppant concentration for the storable composition is up to 75-80% by volume of the fluid.

Nowadays, for these jobs proppant is typically pumped either continuously at 1 ppa max, or alternatively as proppant ramps up to 2 ppa followed by some flush stages of clean fluid averaging 1 ppa total proppant in the prop stages. In the case of the proppant ramps followed by clean fluid flush, the later is at least a volume of fluid bigger than the wellbore volume, and the volume of the prop stages are several times bigger than the wellbore volume.

The foregoing disclosure and description of the application is illustrative and explanatory thereof and it can be readily appreciated by those skilled in the art that various changes in the size, shape and materials, as well as in the details of the illustrated construction or combinations of the elements described herein can be made without departing from the spirit of the application.

What is claimed is:

1. A storable composition for oilfield application, comprising: a slurry of a carrier fluid and a particulate blend made of proppant; the particulate blend comprising at least a first amount of particulates having a first average particle size between about 100 and 5000 μm and at least a second amount of particulates having a second average particle size between about three and twenty times smaller than the first average particle size, such that a packed volume fraction of the particulate blend exceeds 0.74 and the particulate blend volume is sufficient to substantially avoid settling of the particulate in the carrier fluid, wherein the storable composition is not a cement slurry composition.

2. The composition of claim 1, wherein the carrier fluid comprises a viscosifying agent and water.

3. The composition of any preceding claim, wherein the carrier fluid comprises a friction reducer agent and water.

4. The composition of any preceding claim, wherein the carrier fluid comprises an acid and water.

5. The composition of any preceding claim, wherein the particulate blend comprises a degradable material.

6. The composition of any preceding claim, wherein the particulate blend comprises a viscosifier material.

7. The composition of claim 6, wherein the viscosifier material is an acid soluble polymer which increases viscosity of the composition when in acid pH.

8. The composition of claim 7, wherein the acid soluble polymer is chitosan, chitosan derivative, polyimide, copolymer of vinyl pyridine, copolymer of acrylic and/or methacrylic acid or a mixture thereof.

9. The composition of claim 7, wherein the particulate blend comprises an acid precursor.

10. The composition of claim 9, wherein the acid precursor is encapsulated.

11. The composition of any preceding claim, wherein the particulate blend further includes a third amount of particulates having a third average particulate size that is smaller than the second average particulate size.

12. The composition of any preceding claim, wherein the packed volume fraction of the particulate blend exceeds 0.8.

13. A method of servicing a well on a well site, comprising:
preparing a storable oilfield composition comprising a slurry of a carrier fluid and a particulate blend made of proppant; the particulate blend comprising at least a first amount of particulates having a first average particle size between about 100 and 5000 µm and at least a second amount of particulates having a second average particle size between about three and twenty times smaller than the first average particle size, such that a packed volume fraction of the particulate blend exceeds 0.74; and
delivering the storable oilfield composition to the well, wherein the storable oilfield composition is not a cement slurry composition.

14. The method of claim 13, wherein the particulate blend volume is sufficient to substantially avoid settling of the particulate in the carrier fluid.

15. The method of any of claims 13-14, further comprising estimating for the type of treatment an updated concentration and an updated volume of proppant needed; and
providing on the well site the needed updated concentration of proppant.

16. The method of claim 15, wherein the step of estimating for the type of treatment the updated concentration and the updated volume of proppant needed is repeated during the treatment.

17. The method of any of claims 13-16, wherein the concentration by volume of proppant in the composition is between 75% and 94%.

18. The method of any of claims 13-17, wherein the concentration by volume of proppant in the composition is between 75% and 80%.

19. The method of any of claims 13-18, wherein the treatment type is selected from the list consisting of: hydraulic fracturing, drilling, gravel packing, sand control and other completion or workover types of treatments.

20. The method of any one of claims 13-19, wherein the particulate blend comprises a viscosifier material able to reduce settling of the particulate in the carrier fluid.

21. The method of claim 20, wherein the viscosifier material is an acid soluble polymer which increases viscosity of the composition when in acid pH.

22. The method of claim 21, wherein the acid soluble polymer is chitosan, chitosan derivative, polyimide, copolymer of vinyl pyridine, copolymer of acrylic and/or methacrylic acid or a mixture thereof.

23. The method of claim 21, wherein the particulate blend comprises an acid precursor.

24. The method of claim 23, wherein the acid precursor is encapsulated.

25. The method of any of claims 13-24, wherein the particulate blend further includes a third amount of particulates having a third average particulate size that is smaller than the second average particulate size.

26. The method of any of claims 13-25, wherein said serving the well is hydraulic fracturing.

27. The method of any of claims 13-25, wherein said serving the well is gravel packing.

28. The method of any of claims 13-25, wherein said serving the well is drilling.

29. The method of any of claims 13-25, wherein said serving the well is performing a frac and pack treatment.

* * * * *